United States Patent [19]

Parker

[11] 3,730,976

[45] May 1, 1973

[54] COLOR SIGNAL RECORDING AND DECODING

[75] Inventor: Norman W. Parker, Wheaton, Ill.

[73] Assignee: Motorola, Inc., Franklin Park, Ill.

[22] Filed: Dec. 20, 1971

[21] Appl. No.: 210,098

Related U.S. Application Data

[63] Continuation of Ser. No. 8,947, Feb. 5, 1970, abandoned.

[52] U.S. Cl. ....................178/5.4 CD, 178/6.7 A

[51] Int. Cl. ....................H04n 5/86, H04n 9/02

[58] Field of Search ....................178/5.2 R, 5.2 D, 178/5.4 R, 5.4 CD, 6.7 A

[56] References Cited

UNITED STATES PATENTS

| | | | |
|---|---|---|---|
| 2,769,028 | 10/1956 | Webb | 178/6.7 A |
| 3,335,219 | 8/1967 | Goldmark | 178/6.7 A |
| 3,459,885 | 8/1969 | Goldmark | 178/5.2 R |
| 3,475,549 | 10/1969 | Goldmark | 178/6.7 A |

*Primary Examiner*—Howard W. Britton
*Attorney*—Mueller & Aichele

[57] ABSTRACT

Color signal recording in which recorded pulses have widths and positions to represent color saturation and hue. For example, pulses of variable width are recorded, with alternate pulses representing one hue while interspersed pulses represent another hue. The system may use a flying spot scanner operating on a brightness image representation and on the color signal information to generate complete image representative signals. Circuitry is disclosed for minimizing error in deriving signals from the recording, which may be in the form of photographic film, for example, and also reducing error in the synchronization of the scanning operation. Display of the image representative signals may be through known television techniques.

16 Claims, 4 Drawing Figures

Inventor
NORMAN W. PARKER
BY Mueller, Aichele & Rauner
ATTYS.

Inventor
NORMAN W. PARKER
BY
Mueller, Aichele & Rauner
ATTYS.

COLOR SIGNAL RECORDING AND DECODING

This application is a continuation of application Ser. No. 8,947 filed Feb. 5, 1970 and now abandoned.

GENERAL

This invention relates to electronic reproduction of images which have been recorded in coded form. It has been known to record image or picture information on magnetic tape to be scanned for readout and reproduction. It has also been known to use photographic film as the record and to scan images thereof, either in monochromatic form or in actual colors, by the raster of a cathode ray tube which permits generation of cyclic signals to represent the video information. Coding of the signals to represent color information is, of course, an advantage over using actual color images since making such a recording can be less costly and its permanence can be greater.

Color signal coding systems of the past have presented problems of minimizing the effect of record imperfections and of deriving relatively stable hue information from the record. For complete image color information, the recording must include color information represented in two signals, each a function of hue and saturation. However, multiplex recording and decoding to accomplish this have often presented difficulties in avoiding cross-talk, or interference between the different sets of image color information.

A still further problem sometimes experienced in prior image recording processes has been the matching of the record characteristic and the recorded signals so that information can be derived with accuracy as to amplitude and linearity for faithful reproduction of the images.

SUMMARY

Accordingly an object of this invention is to record image color information in a two recording level, or digital, form to improve the fidelity of the image signals and reduce recording costs and simplify the record making process.

Still another object is to represent hue and saturation information in pulse code form to be decoded in a scanning operation so that a digital synchronizing system can be properly controlled for accurate signal derivation even with a record medium which is deteriorated or damaged.

Still another object is to reduce cross interference in multiplex recorded information through the use of switching circuits wherein signal translating channels are synchronized to be rendered alternately operative and periodically resynchronized as the coded image is cyclically scanned in order to minimize translation of spurious information in the multiplex decoding channels.

In a particular form, the image recording and decoding system utilizes a strip of photographic film with a series of brightness, or monochrome, image areas associated with coded color information areas. The color and brightness image areas are scanned in two dimensions by an electron beam to generate video frequency signals. Color information is represented in digital form with recorded pulses variable in width to represent color saturation and different hues represented by interspersed sets of the recorded pulses.

For decoding, odd pairs of record level changes are derived by one gate circuit and even pairs of record level changes are derived by another gate circuit so that an integrated form of the signals translated by the two gate circuits represents pulse width, or widths of the pairs of record level changes, thus forming two color representative signals. The output of the gate circuits is under the control of the leading edges of the recorded pulses, that is, the first of a pair of record level changes, in order to properly synchronize, and alternately render operative, the gate circuits.

The frequency of the recorded pulses is preferably an integral multiple of the horizontal scanning rate. The beginning of each line of the recorded information to be scanned is comprised of recorded pulses associated with only one hue, to resynchronize or correct the synchronization of the gating circuits, thereby insuring that the circuits translate only the proper parts of the signals being decoded.

Since an optical system for flying spot scanning of the color representative and brightness images may cause a shading error, or signal level variation across a scanned area of the record, it may also be desirable to derive a shading representative signal from the amplitude level of the pulse information as originally scanned on the record. Such a signal may be used for treating the shading error in either the derived color information signals or in the scanning raster itself.

DRAWINGS

DETAILED DESCRIPTION

Figure 1:
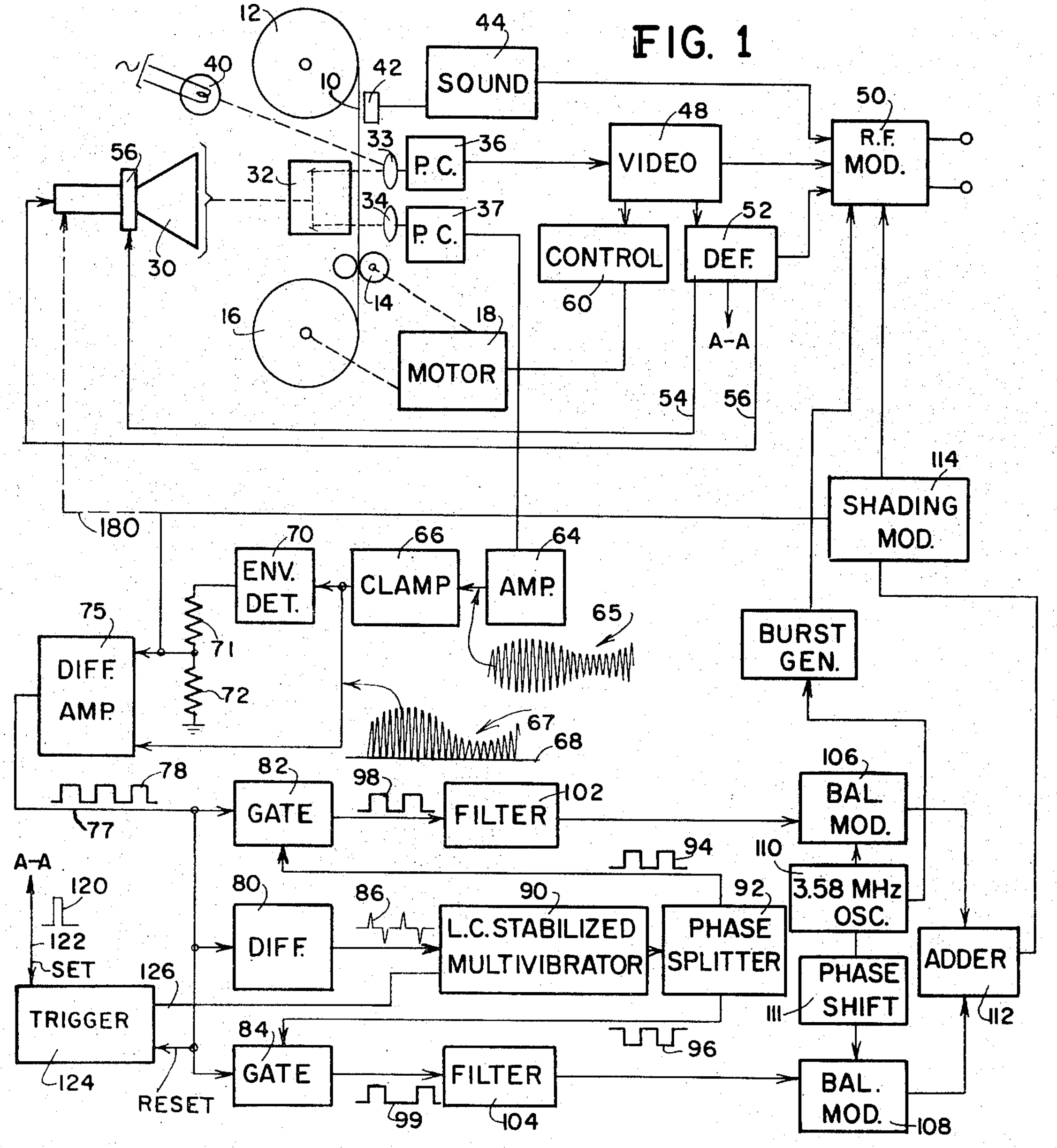
FIG. 1 is a block diagram of apparatus in accordance with the invention for deriving brightness video signals and color coded signals from a recording medium.

The apparatus of FIG. 1 functions to derive from a record medium signals representing image brightness information signals represented by coded color information, and signals representing accompanying sound. The brightness, color and sound information signals are shown as applied to a modulator to form a multiplex modulated carrier signal which is tunable on one channel of a standard television receiver. Alternatively, of course, the video and sound signals may be directly applied to a cathode ray image reproducer and an audio frequency reproducing system for direct reproduction of the recorded information without going through the intervening processes of modulating and demodulating as occurs in the usual television transmission system. It will also be apparent upon consideration of the following description that the record medium could take forms other than the photographic film described in detail, and that a record medium such as magnetic tape or an embossed strip could also be successfully operative within many aspects of the system.

In FIG. 1 the film 10 is drawn from the supply reel 12 by the capstan 14 and wound on the takeup reel 16. A motor 18 drives the capstan 14 and the takeup reel 12.

Figure 2:
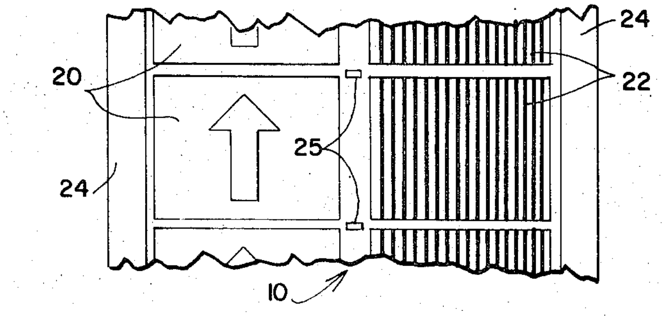
FIG. 2 is a representation of a segment of photographic film having color information recorded in accordance with the invention.

FIG. 2 illustrates a segment of the photographic film which includes the brightness image frames 20 and the color coded frames 22 in side by side relation along the length of the film 10. Sound tracks 24 extend along opposite edges of the film for magnetic recording of stereophonic sound information, or for providing two different sets of sound information alternately usable with the images. In the central area of the film 10 between the image areas 20 and 22 there are synchronizing windows 25 which may be, for example, clear areas of the film in an otherwise opaque region of the film so that frame scanning of the image areas can be synchronized.

It will be recognized that the representation of the film scanning apparatus of FIG. 1 is illustrated for clarity as longitudinally displaced whereas actually the scanning apparatus should be laterally positioned for scanning of the side by side images 20 and 22 of the film of FIG. 2. However, the raster generated by the cathode ray tube 30 is projected through an optical image splitter 32 so that the same raster image is projected through each of the frames 20 and 22 of the film 10. Associated lenses 33 and 34 focus the raster images on the photocells 36 and 37, the photocell 36 providing a signal representing the video information of the brightness frame 20 and the photocell 37 providing the electrical signal corresponding to variations in the opaqueness of the color coded image areas 22.

A light bulb 40 is energized to provide illumination which can be optically conducted to the region through which the synchronizing windows 25 (FIG. 2) pass in order to periodically generate a signal in the photocell 36 representing frame scanning information. A magnetic pickup head 42 scans the sound tracks 24 and is coupled to the sound circuitry 44 to develop audio signals represented in the record 10.

The brightness frames 20 are illustrated as simply the image of an arrow. These frames may be in the form of a series of black and white transparencies with the series depicting various stages of motion as is common in motion picture photography. They modulate the light from the raster of the tube 30 to produce a series of horizontal scanning cycles of video information which is translated from the photocell 36 to the video amplifier 48. This video information may be in a frequency range of 0 to three or more megacycles as is common in television. The signal is then translated to the RF modulator 50 for modulation of a suitable carrier wave to be developed at the output terminals thereof for application to the tuner of a television receiver.

A portion of the output information of the video amplifier 48 will also include vertical scanning pulses from the light of bulb 40 passing through the synchronizing windows 25. Such pulses are coupled to the deflection system 52. System 52 provides horizontal and vertical sweep signals by way of lead 54 to the deflection yoke 56 on the cathode ray tube 30. The system would, of course, operate to scan a new one of the brightness frames 20 in response to each sync window 25 (at a 60 cycle rate) and the scanning of each frame could take place, in accordance with usual television practice, at a horizontal deflection rate of 15.734 MHz. The deflection system 52 also provides a blanking pulse during horizontal retrace over lead 56 which is applied to the cathode-grid circuit of the tube 30 for blanking the raster during retrace. It is also appropriate, of course, to couple sweep control signals from the deflection circuit 52 to the modulator 50 so that suitable vertical and horizontal deflection control pulses may be incorporated in the output of the modulator 50.

It is also necessary to control the speed of the motor 18 so that the film is driven past the raster projected through the prism and lenses 32, 33 and 34 in synchronism with vertical scanning in picture tube 30. Accordingly a control circuit 60 is coupled to the video amplifier 18 to be responsive to signals developed by the sync windows 25. The control circuit 60 is coupled to the motor 18 to speed up or slow down the drive of the record medium so that start of vertical scanning takes place at the beginning of each image frame.

It will be recognized that the system described thus far is operative to produce at the output of the RF modulator 50 a monochrome television signal including sound information, brightness video information, and horizontal and vertical sweep control signals which could be coupled to the input of a receiver for processing in a known way to produce a black and white image together with appropriate sound. Attention will now be directed to the recording and decoding of the color information represented in the image frames 22.

When the color coded frames 22 modulate the image of the raster on the face of the tube 30 as it is projected on photocell 37, the photocell output will comprise a signal varying in response to the clear and opaque stripes, or record level changes, of the frames 22. The signal is applied to the amplifier 64 and from there to the clamping circuit 66. As will be apparent presently, the amplitude of the color representative signal may vary due to variation in light conduction of optical system 32–34 across the entire raster. The circuit 66 will clamp one set of peaks of the wave 67 to a fixed level 68.

The clamped color representative signal 67 is applied to the envelope detector 70 which will develop an output across resistor 71 and 72 that varies with the peak level of the wave 67, the envelope being represented by the positive peaks of the signal 67 as depicted in FIG. 1. Resistors 71 and 72 are of equal value so that one-half of the envelope amplitude is developed across resistor 72 and applied to the differential amplifier 75. The output of the clamp circuit 66 is also applied to the other input of the differential amplifier 75 so that the amplifier 75 will effectively operate upon the wave 67 and one-half of the amplitude of the envelope of the wave 67 which amounts to restoring the wave 65 to its central axis. In other words, on the average the amplitude variations of the signal translated in the differential amplifier 75 vary equally in the positive and negative direction about a restored axis. Amplifier 75 has a further characteristic of amplitude limiting or clipping the wave which it translates so that the output thereof on lead 77 is a clipped form of the wave 65 having fixed amplitude about a central axis. The widths of the pulses comprising wave 78, however, correspond with the widths of the various portions of the wave 65 and thus correspond with the widths between record level changes in the image areas 22.

Figure 3:
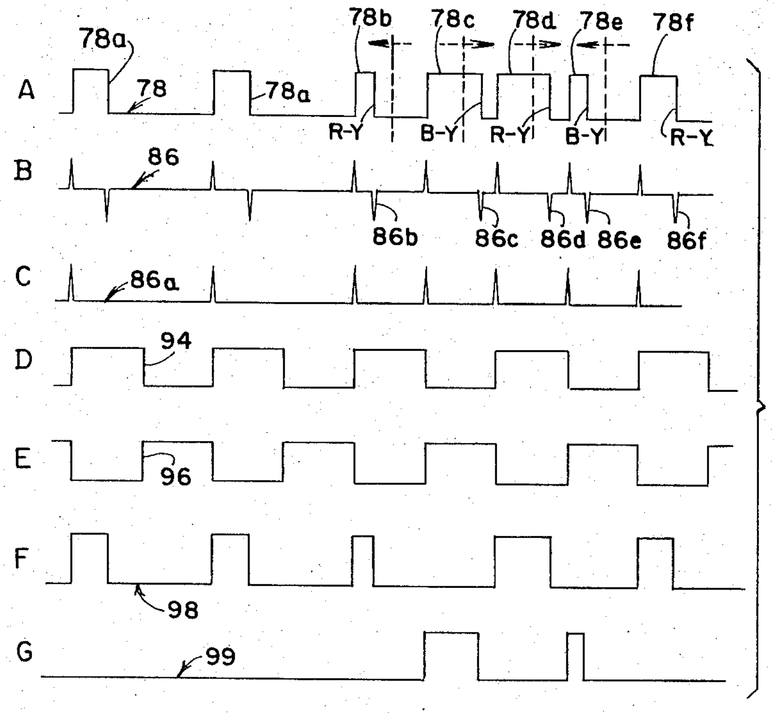
FIG. 3 is a series of amplitude versus time wave forms derived from scanning a record medium which carries color information in accordance with the invention.

Attention is now invited to FIG. 3 for a consideration of the precise nature of the image area 22 and the spacing of the record level changes which provide saturation and hue information.

It should be recognized that the image areas 22 in the film segment of FIG. 2 are merely representative of what would generally appear to be a series of vertical black stripes interspersed with transparent stripes on film. However, in actual detail the signal 78 at the output of the differential amplifier 75 derived from areas 22 may include variations as shown by curve A of FIG. 3. The positive tips of the wave 78 in FIG. 3 represent clear areas of the image 22 and the negative or lowermost portions of the wave represent opaque regions of the image 22, during one horizontal scan. It is contemplated that the total number of stripes of the image area, and thus the total number of pulses across a frame, be an integral multiple of the horizontal scanning frequency, for example the 70th or 80th harmonic. It is also contemplated that at the side of the image area 22 at which the raster scanning begins there be a series of 3 to 5 synchronizing pulses 78*a* which will control the decoding operation to be described presently. The record level changes, that is those changes from clear to opaque and from opaque to clear on the film, which are scanned to produce the synchronizing pulses 78*a* should occur during the horizontal blanking operation (the signal fed to the tube 30 via lead 56 FIG. 1) so the synchronizing operation is not visible in the reproduced images.

The signal 78 of FIG. 3 is also shown as including time division multiplex pulses 78*b*, 78*c*, 78*d*, 78*e*, and 78*f*. It should be understood that each of these pulses is representative of different color information and that in a practical recording this particular sequence might not occur. Such a recording would likely include a number of like pulses corresponding to a given saturation and hue for the area of the image represented thereby. Alternate pulses of the wave 78 represent so-called R-Y or red color difference signals and pulses interspersed with those represent so-called B-Y or blue color difference signals. That is, these signals represent the saturation of red and blue as can be combined with the corresponding brightness information derived from the image areas 20 to develop red and blue image representative signals as utilized in a color television receiver.

In FIG. 3 the pulses 78*b*, 78*d*, and 78*f* represent R-Y and the pulses 78*c* and 78*e* represent B-Y. Pulses are varied in width to represent the saturation of the coloring information. Pulse 78*b* shows the narrowest of pulse width, the pulse 78*d* represents the widest width and pulse 78*f* represents a nominal pulse width, which is one-fourth the width to the next R-Y pulse. Pulses 78*a* are arranged to fall where the R-Y pulses would normally fall, and the B-Y pulses which would normally be interspersed with the synchronizing pulses 78*a* are omitted. It is also contemplated in this particular form, that the leading edges of all of the pulses are fixed and only the trailing edges are varied to represent modulation information. In this particular example the leading edges of the pulses are defined by a record level change from opaque to clear and the trailing or modulation information edges of the pulses are represented on the recording by a record level change from clear to opaque. However, this arrangement of the record representation can be reversed, it only being necessary that the spacing between pairs of record level changes in the image areas 22 represent the widths of the pulses of the signal 78 as derived on lead 77 in FIG. 1. It can further be recognized that as the color of the image in different vertical portions of the image areas 22 is different, the widths of the stripes (that is the distance between the record level changes) will vary to represent this coded information, just as the widths of the record level changes will vary in a horizontal direction across the image areas to represent difference in color information in that direction of the image areas.

With the above explanation of the details of the digitally coded information of the image areas 22 as derived in a scanning operation represented within the limits of curve A of FIG. 3, reference may now be had to the remaining circuitry of FIG. 1 to understand horizontal synchronization of the decoding system and development of the separate R-Y and B-Y color representative signals from the composite of signal 78.

The signal 78 derived from horizontal scanning of the image area 22 is applied by way of lead 77 to the differentiating circuit 80 and to the gate circuits 82 and 84. The gates 82 and 84 are alternately rendered conductive in a controlled fashion to translate only the R-Y pulses in the gate 82 and the B-Y pulses in the gate 84. The differentiating circuit 80 develops pulses of spikes represented by wave 86 in curve B of FIG. 3. These pulses are developed in response to each record level change and thus define both leading and trailing edges of the pulses of signal 78.

The signal 86 is applied to the stabilized multivibrator circuit 90 which may include a tuned circuit to maintain a relatively constant frequency of operation. The circuit 90 is responsive to the positive going pulses of the wave 86, as represented by curve C and wave 86*a* in FIG. 3. Signal 86*a* is, of course, representative of only the leading edges of the pulses in the signal 78. With the multivibrator 90 triggered by the signal 86*a* its output is applied to the phase splitter 92 providing square waves of opposite phase, with the signal 94 being applied to gate 82 and the signal 96 being applied to gage 84. Curves D and E respectively of FIG. 3 represent signals 94 and 96. The width of the control signals from the multivibrator 90 is such that signal initiation corresponds approximately with the leading edges of the pulses of signal 78 and the trailing edges extend at least as long in time as the extent of a pulse of signal 78 having a maximum width.

Therefore the gates 82 and 84 are alternately rendered conductive for a time sufficient to pass only the R-Y and B-Y pulses respectively, to the exclusion of the preceding and succeeding pulses applied thereto via lead 77. Thus the output of the gate 82 is represented by the signal 98 (curve F of FIG. 3) and the output of the gate 84 is represented by signal 99 (curve G of FIG. 3). Signal 98 corresponds with the R-Y pulses of signal 78, that is pulses 78*a*, 78*b*, 78*d* and 78*f*. Signal 99 corresponds with the B-Y pulses of signal 78 which includes the pulses 78*c* and 78*e*.

Gate 82 is connected to a filter 102 and gate 84 is connected to a filter 104 so that the output signals 98 and 99 are respectively integrated therein to produce a pair of color representative video signals varying in accordance with R-Y and B-Y pulse widths and representing the degree of saturation of the hues corresponding to those signals.

The signal from filter 102 is applied to balanced modulator 106 and the signal from filter 104 is applied to balanced modulator 108. Modulator 106 is also controlled by a signal from the oscillator 110 which has the frequency of the color sub-carrier standard in color television practice (approximately 3.58 MHz). The signal from oscillator 110 is also phase shifted by approximately 90° by the circuit 111 and applied to the modulator 108. The outputs of the modulators 106 and 108 are applied to the adder circuit 112 and through the shading modulator 114 to the RF modulator 50 to be incorporated with the television signal generated thereby as a quadrature modulated sub-carrier carrying the multiplex information of two color difference signals which will be reproducible by the usual color television receiver.

Circuitry is also included in the system of FIG. 1 to properly line synchronize the "escapement" type demodulator which alternately renders the red and blue signal developing channels operative. To accomplish this a horizontal retrace pulse 120 is applied from the deflection system 52 by way of lead 122 as a setting signal for the trigger circuit 124. The output of trigger circuit 124 is coupled by way of lead 126 to an input of the multivibrator circuit 90 to interrupt its operation during pulse 120. Then the next signals applied on lead 77 as a reset for trigger 124 are the synchronizing pulses **78*a* the circuit 124 is ready for use on the next retrace and circuit 80 is operating to produce R-Y signals in response to pulses 78*a*** which insures proper synchronism at the start of each scanning line. This prevents the system from synchronizing on B-Y signals which it otherwise might not distinguish from R-Y signals.

Figure 4:
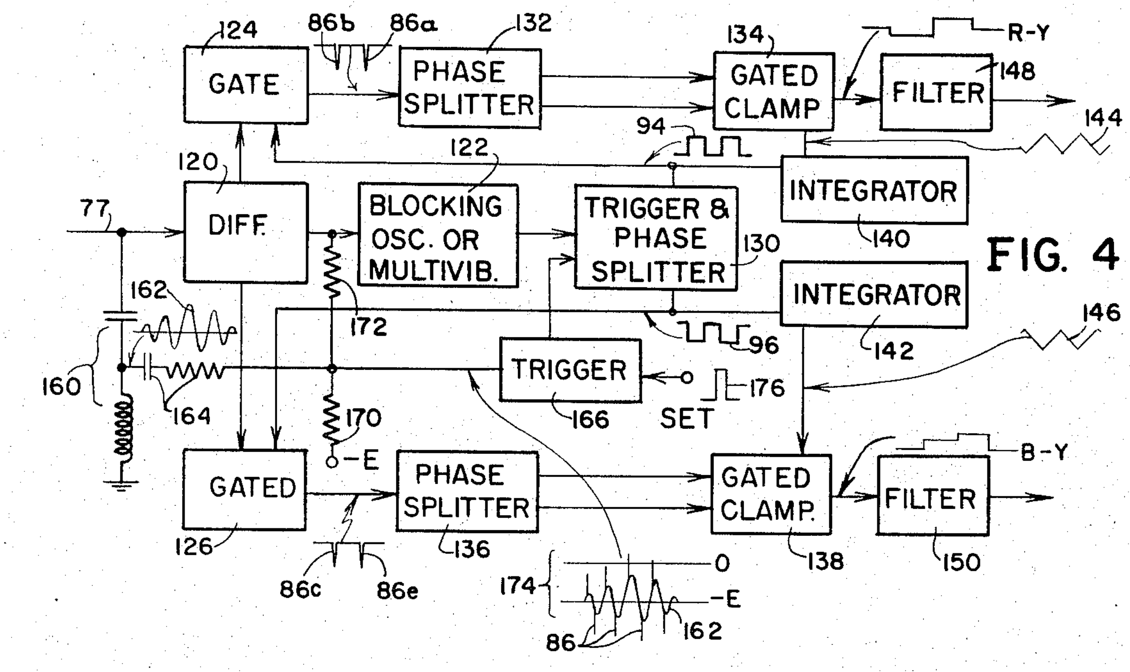
FIG. 4 is a block diagram of a modified portion of the decoding apparatus of FIG. 1.

The circuit of FIG. 4 is a modified form of decoding apparatus and offers some differences in operating characteristics which may be desirable in certain cases. It is contemplated that the color representative signals applied by lead 77 to the system of FIG. 4 correspond with those of signal 78, with one exception. The exception is that while the initial synchronizing pulses developed at the start of each horizontal scanning cycle correspond with the R-Y phase of the signal, these signals are increased in duration so that they have a 50 percent duty cycle. Thus the recording is changed at the side of the image areas 22 so pulses **78*a* take the form of the wave 94** of FIG. 3, wherein the synchronizing pulses would be on half of the time and off half of the time.

The circuit in FIG. 4 contemplates a different way to develop the gate control signal to insure that the gates translate only the proper associated color representative signals. The system of FIG. 4 also provides a signal decoding method wherein the absence of some of the pulses (cause for example by damage or scratching of the image area 22) will produce what may be a less apparent deterioration of the image than is the case with the circuit of FIG. 1.

In FIG. 4 the input lead 77 translates the pulse modulation signal 78 to the differentiating circuit 120. Circuit 120 will provide the pulses of signal **86*a* (FIG. 3) to the blocking oscillator or multivibrator 122 to control this oscillator in accordance with the leading edges of the pulses, which of course represent the record level changes from opaque to clear in the image areas 22. Differentiating circuit 120 also provides pulses to the gate circuits 124 and 126 which pulses coincide with the trailing edges of the pulses of signal 78. These are the negative going pulses of wave 86 such as pulses 86*b* – 86*f***.

The oscillator circuit 122 has an output coupled to the trigger and phase splitter circuit 130 providing output waves 94 and 96 which are of opposite phase and have leading edges corresponding with the leading edges of the signals in wave 78 and trailing edges which encompass the maximum pulse width modulation to be encountered in the signal 78. Signals 94 and 96 are respectively coupled to the gate circuits 124 and 126 so that these gates are alternately rendered conductive to pass the pulses applied thereto from the differentiating circuit 120. Since the gate 124 is controlled by the signal 94 in accordance with the timing of the pulses representing R-Y information, the output of the gate 124 will be pulses **86*b*, 86*d*, and 86*f*, etc. Through corresponding operation the output of the gate 126 comprises the pulses 86*c*, 86*e***, etc.

The output of gate 124 is coupled to the phase splitter circuit 132 which applies opposite phase signals to the gated clamp circuit 134. Similarly the phase splitter 136 couples the output of gate 126 to the gated clamp 138 for the pulses representing the B-Y information.

The signals from the trigger circuit 130 are also applied to two integrator circuits with the signal 94 applied to the integrator circuit 140 and the signal 96 applied to the integrator circuit 142. The output of the integrator 140 is a symmetrical saw-tooth signal 144 applied to the gated clamp 134 and the output of the integrator circuit 142 is a phase displaced saw-tooth signal 146 applied to the gated clamp 138.

It can be seen that the gated clamps 134 and 138 will respond to the symmetrical saw-tooth signals superimposed upon which are the pulses applied from the phase splitters 132 and 136. Thus the output of each gated clamp will be a voltage proportional to the level of the saw-tooth signal applied thereto at the time when the pulses 86 occur during the sawtooth thereby effectively developing a signal proportional to the time between the start of each saw-tooth portion of the wave and the time when the pulses 86 occur. This is, of course, a signal representing the pulse width with the output of gated clamp 134 representing the R-Y information of pulses **78*b*, 78*d*, and 78*f*, while the output of the gated clamp 138 represents the widths of the pulses 78*c* and 78*e* which is the B-Y information. The gated clamps 134 and 138 are respectively coupled to the filters 148 and 150** which will produce color representative video information as smoothly varying signals rather than in the step form in which they are produced by the gated clamps.

The functioning of the circuit of FIG. 4 can be an advantage in cases where there is damage to the image areas 22 of the recording medium, or electrical noise in the color decoding process, wherein scratches of the film or dirt on the film will be translated as impulses in the decoding system which could adversely affect it. The circuit of FIG. 4 is what might be termed a balanced time-discriminator which has the characteristics that with no signal input, that is when the signal 86 is missing, there is no signal output from the filters 148 and 150. There is a further advantage if pulses of the signal 86 are missing in the decoding system, the output of the gated clamps 134 and 138 will remain at the preceding signal level rather than immediately changing to some other voltage level which would more likely produce incorrect color information. Furthermore the system is balanced so that when the system is operating at a no-color condition corresponding to white, the output of the two-color difference channels is zero since the saw-tooth signals are AC coupled to the gated clamps. Additionally, there is no one megacycle component in the output to be filtered, as would be the case for the circuit of FIG. 1.

The system of FIG. 4 also includes a modified method of synchronizing the decoding operation at the start of each horizontal scanning cycle of the image areas 22 of the recording medium 10. The phase of blocking oscillator or multivibrator 122 is established at the start of each horizontal scanning line so that it can be reversed if the system is reading the R-Y pulses as though they were B-Y pulses. To accomplish this the synchronizing pulses 78*a* are widened so that they have a 50 percent duty cycle, but yet they are maintained in their usual phase relationship. In effect the modified pulses 78*a* will appear like the signal 94 of FIG. 3. Three to five cycles of this form of the signal are recorded at the start of each horizontal scanning area of the record medium 22 to be applied by way of lead 77 (FIG. 4) to the series tuned circuit 160. The several cycles of the synchronizing pulses will build up a ringing signal 162 since the circuit 160 is tuned to the frequency of the pulses 78*a* which are at a 50 percent duty cycle. The sine wave 162 is coupled through the RC network 164 to the input of the trigger circuit 166. The input of the trigger circuit 166 is also coupled through a resistor 170 to a source of negative DC potential. The input of the trigger circuit 166 is further coupled through the isolating resistor 172 to the output of the differentiating circuit 122. Accordingly the composite input to the trigger circuit 166 is as represented in curve 174 with the sine wave 162 variable about the negative E potential and the pulses of wave 86 added on top of the sine wave.

A horizontal retrace pulse 176 sets trigger circuit 166 which holds circuit 130 in a condition for turning on gate 126 and turning off gate 128, that is so the system is prepared to conduct B-Y signals. After retrace but during blanking the ringing signal 162 builds up in amplitude after two or three of the synchronizing pulses 78*a* (as modified) and the amplitude of the composite of the pulses 86 and the sine wave exceeds a voltage level, for example, zero, which operates the trigger circuit 166. Accordingly, after development of signal 174, trigger 166 is operated to apply a triggering signal to circuit 130 which will then respond to the remaining sync pulses 78*a* of R-Y phase. By requiring several sync pulses in signal 174 before the system starts in the R-Y phase, line synchronism of the system is made with greater reliability.

Reference is again made to FIG. 1 to consider correction of shading errors occurring through the fact that the optical system 32, 33, and 34 may project central portions of the raster of tube 30 in brighter form to the photocells 36 and 37 than is the case for the edges of the projected raster.

Since the two signals demultiplexed by the decoding operation represent color difference signals, for example, the R-Y and B-Y signals, there is a brightness component represented in these signals. These signals are, of course, combined in the television reproducing operation with the Y or brightness signals produced from the image areas 20 of the film 10 so that the image reproducer is effectively driven by simply red or blue representative signals.

However, in decoding the color information of the image areas 22 the operation of the envelope detector 70 compensates for amplitude changes of the signal 67 as originally derived so that there is no shading error in this signal. (Many more cycles or pulses are shown in signal 67 than in the axis restored and clipped signal 78 to suggest the gradual shading which may occur across a line scan.)

Accordingly it is possible to utilize the output of the envelope detector 70 as developed across resistor 72 and apply it to the shading modulator 114 in a way to cause "shading" of the color difference signals as applied to the modulator 50 so that they will correspond with the already shaded brightness signals as developed in the video amplifier 48. On the other hand, to do away with shading altogether it may be more desirable to omit the shading modulator 114 and use the output on lead 180 of the envelope detector 70 to control the grid to cathode circuit of a tube 30 to reduce brightness in bright optical areas of the raster and remove optically caused video amplitude variations in the brightness signal so that it will match the color difference signals from the color decoder, which signals do not contain the optically caused shading errors.

The above described signal recording and decoding system is operative with simple digitally recorded information in the form of pairs of recording level changes without requiring particular intermediate recording levels, thus obviating the problems of linearity and tracking of such intermediate levels for faithful signal reproduction. The pairs of record level changes forming the code system provide both color decoding synchronization with horizontal scanning as well as alternating control of the multiplex decoding operation whereby two different color signals are alternately derived. The system can be effective with damaged recording media as would be the case where there are spots or missing stripes on the film since synchronization of the decoder may be maintained despite the loss of some information from the color image areas.

It has been found feasible to design the system for color video frequency response of over 500 kilocycles by using a frequency for the pulses of signal 78 approximately 1.1 to 1.2 MHz which amounts to a multiple of 70 or 80 times the horizontal deflection frequency. This will give half that number of "bits" of color information per color in a given scanning line. The system is thus compatible with present day television receivers which generally provide color video information of the order of 500 kilocycles in bandwidth.

I claim:

1. An elongated record medium having image areas with brightness and color information recorded on different image areas thereof, the color information representing on said medium electrical pulses of widths which are variable in time, said medium having pairs of first and second record level boundaries spaced across image areas representing said color information thereof, the spacing between said first record level boundaries of the pairs of said boundaries representing one type of color information and the positions of said second of said record level boundaries relative to said first record level boundries representing another type of color information.

2. The record medium of claim 1 in which the first record boundary of each pair is at a fixed position in the image area for synchronizing, and the second record boundary of each pair varies in position among the record boundaries to represent color saturation information.

3. The record medium of claim 2 in which odd pairs of record level boundaries represents R-Y color information and the even pairs of record level boundaries represents B-Y color information.

4. The record medium of claim 3 in which one side of each image area representing said color information is composed of a group of pairs of record level boundaries established in the position related only to R-Y color information.

5. An elongated photographic film having a series of image brightness and color representing areas recorded thereon, the color representing areas each comprising a plurality of adjacent pairs of alternate opaque and clear strips of varying relative widths, the relative widths of the stripes in each pair representing color saturation information, odd pairs of stripes representing one hue, and even pairs stripes interspersed therewith representing a different hue.

6. A color signal decoder, including in combination, means for scanning a record medium having two recording levels, the spacing between record level changes of the medium representing color saturation and odd pairs of record level changes representing one color while even pairs of record level changes represent another color, so that said scanning means develops impulses representing spacing of pairs of record level changes, first and second gates coupled to said scanning means, a control circuit coupled to said scanning means for generating gate control signals responsive to one of the pairs of each record level change, means coupling the gate control signals to said gates for controlling said first gate to translate signals representing the spacing between the odd pairs of level changes and said second gate to translate signals representing the spacing between even pairs of level changes, and circuit means forming color representative signals from the signals translated by said first and second gates.

7. The color signal decoder of claim 6 in which said circuit means forming color representative signals includes a gated clamp circuit coupled to each of said first and second gates for responding to the timing signals representing level changes translated therefrom to develop the color representative signals.

8. The color signal decoder of claim 6 wherein the record medium is cyclically scanned and said medium has pairs of synchronizing record level changes at a position associated with the start of a scanning cycle, such synchronizing level changes being associated with said one color, means for operating said control circuit to generate gate control signals associated with said other color at the start of the scanning cycle, and means responsive to the synchronizing record level changes for operating said control circuit to generate gate control signals associated with said one color at the start of the scanning cycle.

9. The color signal decoder of claim 8 in which said means responsive to the synchronizing level changes includes a level responsive circuit requiring a plurality of synchronizing level changes for operating said control circuit.

10. The color signal decoder of claim 6 further including clamping and detector means coupled to said scanning means for establishing the impulses therefrom about a central axis, and means coupled to said first and second gates for amplitude limiting the signals from said clamping and detector means whereby the same represents spacing of said record level changes.

11. The color signal decoder of claim 10 wherein said means for scanning a record medium includes an optical system introducing variable levels of the impulses and means intercoupling said clamping and detector means and said scanning means for controlling said scanning means to compensate for the variation of illumination therein.

12. An elongated record medium having recorded thereon information to be scanned for display of images in color, said medium having a series of first image areas having information recorded thereon representing the brightness of an image, said medium having a series of synchronizing indicia thereon, and said record medium further having a series of second image areas representing color information associated with corresponding ones of said first image areas, said second image areas comprising pairs of two level record stripes extending in the direction of the elongation of said medium and having boundaries delineating said pairs of stripes, the placement of said boundaries across said medium alternately representing two different color information characteristics of the image to be displayed, the relative widths of the record stripes in each pair representing color saturation.

13. The combination according to claim 12 in which signal level changes in said color signal from said first level to said second level recur at a predetermined fixed time interval, with the time interval between a signal level change from said first to said second level and following signal level change form said second to said first level being variable to represent variations in color saturation information, and wherein said gating means comprises first and second gates, each having an input coupled to receive said color signal with the output of said first gate corresponding to said first output and the output of said second gate corresponding to said second output.

14. A color signal decoder for decoding a color signal encoded as a sequence of two level pulses, the width of which is varied to contain information indicative of hue and saturation of a color picture and alternate pulses of which each contain independent functions representative of hue and saturation of a color picture, the decoder including in combination:

gating means having at least one input and first and second outputs, with the input thereof coupled to receive said color signal;

control circuit means coupled to receive said color signal for generating control signals responsive to alternate pulses for generating control signals representative of such alternate pulses;

means coupling said control circuit means with said gating means for supplying said control signal to said gating means to control said gating means to translate signals representing said information and said independent functions of even ones of said pulses on said first output and to translate signals representing said information and said independent functions for odd ones of said pulses on said second outputs; and circuit means forming color representative signals from the translated signals appearing on said first and second outputs of said gating means.

15. A color signal decoder for decoding a color signal encoded as a sequence of signal level changes alternating between first and second signal levels, the spacing between signal level changes representing color saturation and odd pairs of signal level changes representing one color and even pairs of signal level changes representing another color, the decoder including in combination:

gating means have at least one input and first and second outputs, with the input thereof coupled to receive said color signal;

control circuit means coupled to receive said color signal for generating control signals responsive to one of the pairs of each signal level change;

means coupling said control circuit means with said gating means for applying said control signals to said gating means to control said gating means to translate signals representing the spacing between the odd pairs of signal level changes on said first output and to translate signals representing the space between even pairs of said signal level changes on said second output; and circuit means forming color representative signals from the translated signal appearing on said first and second outputs of said gating means.

16. An elongated record medium having recorded thereon color representative information areas comprising a plurality of adjacent pairs of two level record stripes each pair of stripes having a predetermined width, with the stripes within each pair having varying relative widths, the relative widths of the stripes in each pair representing color saturation information, odd pairs of stripes representing one color hue, and even pairs of stripes interspersed therewith representing a different color hue.

* * * * *